United States Patent
Baxter et al.

(10) Patent No.: US 7,174,332 B2
(45) Date of Patent: Feb. 6, 2007

(54) METHOD AND APPARATUS FOR SAFEGUARDING FILES

(75) Inventors: Samuel C. Baxter, Fairport, NY (US); Thomas J. Colson, Clarence Center, NY (US)

(73) Assignee: IP. com, Inc., West Henrietta, NY (US)

( * ) Notice: Subject to any disclaimer, the term of this patent is extended or adjusted under 35 U.S.C. 154(b) by 655 days.

(21) Appl. No.: 10/167,187

(22) Filed: Jun. 11, 2002

(65) Prior Publication Data
US 2003/0229637 A1 Dec. 11, 2003

(51) Int. Cl.
G06F 17/30 (2006.01)
(52) U.S. Cl. .................. 707/9; 707/2; 707/8; 707/6; 707/102; 710/200; 709/219; 713/176
(58) Field of Classification Search ............... 707/9, 707/204
See application file for complete search history.

(56) References Cited

U.S. PATENT DOCUMENTS

| | | | | |
|---|---|---|---|---|
| 5,613,012 A | * | 3/1997 | Hoffman et al. | 382/115 |
| 5,864,683 A | * | 1/1999 | Boebert et al. | 709/249 |
| 6,049,671 A | * | 4/2000 | Slivka et al. | 717/173 |
| 6,185,683 B1 | * | 2/2001 | Ginter et al. | 713/176 |
| 6,418,457 B1 | * | 7/2002 | Schmidt et al. | 715/512 |
| 6,487,600 B1 | * | 11/2002 | Lynch | 709/229 |
| 6,532,459 B1 | * | 3/2003 | Berson | 707/3 |
| 6,801,999 B1 | * | 10/2004 | Venkatesan et al. | 713/167 |
| 6,895,091 B1 | * | 5/2005 | Elliott et al. | 380/278 |
| 2001/0039547 A1 | * | 11/2001 | Black et al. | 707/102 |
| 2002/0010679 A1 | * | 1/2002 | Felsher | 705/51 |
| 2002/0029350 A1 | * | 3/2002 | Cooper et al. | 713/200 |
| 2002/0038296 A1 | * | 3/2002 | Margolus et al. | 707/1 |
| 2002/0091734 A1 | * | 7/2002 | Redlich et al. | 707/511 |
| 2003/0005464 A1 | * | 1/2003 | Gropper et al. | 725/115 |
| 2003/0145209 A1 | * | 7/2003 | Eagle et al. | 713/179 |
| 2003/0191717 A1 | * | 10/2003 | Johnson | 705/51 |

* cited by examiner

*Primary Examiner*—Jeffrey Gaffin
*Assistant Examiner*—Mark Andrew X Radtke
(74) *Attorney, Agent, or Firm*—Simpson & Simpson, PLLC

(57) ABSTRACT

A computer implemented method for safeguarding files, comprising the steps of designating a location on a first computer for storage of files to be safeguarded, selecting certain of the files to be safeguarded from the location based upon predetermined selection criteria, copying the selected files to be safeguarded to a second computer, deleting the selected files from the first computer, processing the selected files to be safeguarded on the second computer, and storing the selected files to be safeguarded in a restricted access database. In a second embodiment, the file is copied to a second computer, but not deleted from the first computer, in addition to all other steps of the method. The invention also includes an apparatus for carrying out the methods of the invention.

71 Claims, 5 Drawing Sheets

METHOD AND APPARATUS FOR SAFEGUARDING FILES

FIELD OF THE INVENTION

The invention relates generally to computer software, more specifically to computer software for safeguarding computer files.

BACKGROUND OF THE INVENTION

Presently, systems for third party backup and management of digital files exist that provide periodic copying of digital files from designated locations to an off-site facility where such digital files are kept securely for backup purposes, and are searchable in the event of inaccessibility of the original files.

These systems, however, do not provide day-to-day user flexibility and control of file input, and do not provide appropriate legal safeguarding of files to ensure availability and admissibility of such files if needed at a later date to prove that each file was created on a specific date and has not been changed since that date.

One of the challenges users of file backup and management systems have is that, while they can designate file locations for backup, they cannot easily make a new decision each day as to which files are to be backed up and then made available for group-wide or enterprise-wide search, and which are not. Moreover, users might need to prove the creation of a particular document on a particular date, years after the creation of the document, and can only do so with a system that safeguards documents at or near the time of creation in such a way that they will be available and admissible at an adversarial proceeding in the future.

These existing systems also include electronic lab notebooks, which have been designed to enable users to store information in a more deliberate manner and controlled manner. The problem with these systems, though, is that they require users to adopt the information entry method of the electronic lab notebook. This is a problem because users are accustomed to creating files in more traditional formats such as Microsoft Word, Microsoft PowerPoint, HTML, PDF, RTF, and others, and they often will not take the extra step to move their text and drawings into a separate format or system. The result is that the electronic lab notebooks often get far less use than is needed to protect a company's intellectual property.

What is needed, therefore, is a method and apparatus for electronic file aggregation, search, back-up, and legal safeguarding that is provides users with day-today control over files they input, ease of file entry, and transparent legal safeguarding of files prior to long term storage.

SUMMARY OF THE INVENTION

The invention broadly comprises a computer implemented method for safeguarding files, including the steps of designating a location on a first computer for storage of files to be safeguarded, selecting certain of the files to be safeguarded from the location based upon predetermined selection criteria, copying the selected files to be safeguarded to a second computer, deleting the selected files from the first computer, processing the selected files to be safeguarded on the second computer, and storing the selected files to be safeguarded in a restricted access database. In a second embodiment, the file to be safeguarded is copied to a second computer, but not deleted from the first computer, in addition to all the other steps of the method. The invention also includes an apparatus for carrying out the methods of the invention.

The invention broadly comprises a computer software system that provides one or more of the following:
Third party legal protection of computer data (certification)
Optional indexing, search, and retrieval of computer data (accessibility)
Optional secure third party copies of computer data (backup)

The invention accomplishes its tasks by providing a non-intrusive (i.e., requiring minimal client intervention) method of collecting and packaging one or more documents (computer files) into a standardized format, securely recording evidence of the package, and indexing and storing the package for later retrieval. The invention accomplishes this using an application service provider (ASP) model, a local computer system model, or a combination of both.

A general object of the invention is to provide a method and apparatus for unobtrusively safeguarding computer files.

This and other objects, features and advantages of the invention will become readily apparent to those having ordinary skill in the art in view of the appended claims and drawings, and the following detailed description of the invention.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE PREFERRED EMBODIMENT

Figure 1:
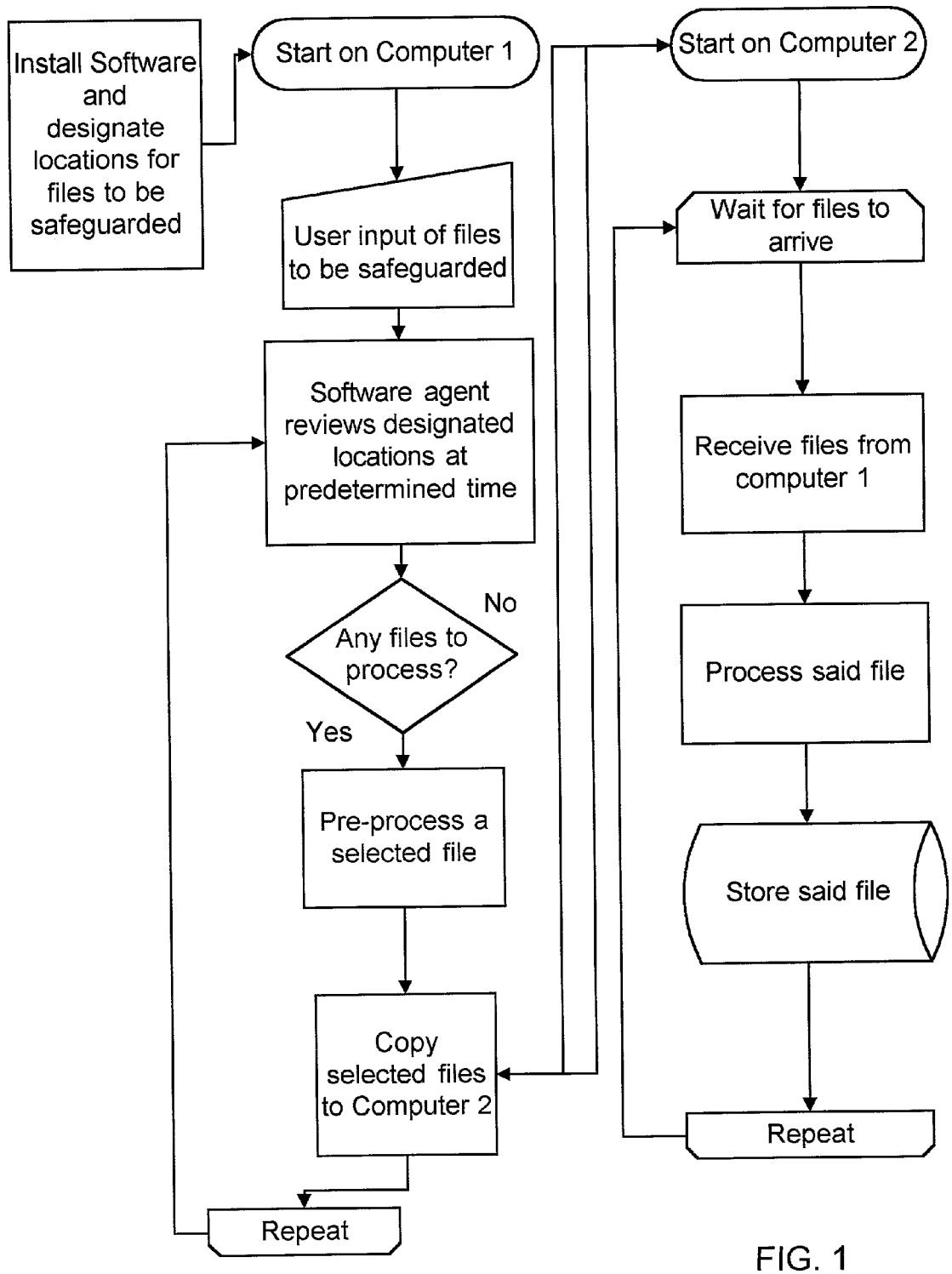
FIG. 1 is a flow chart showing the processing on a first and second computer for an embodiment of the present invention wherein selected files on a first computer are stored on a second computer.
Figure 2:
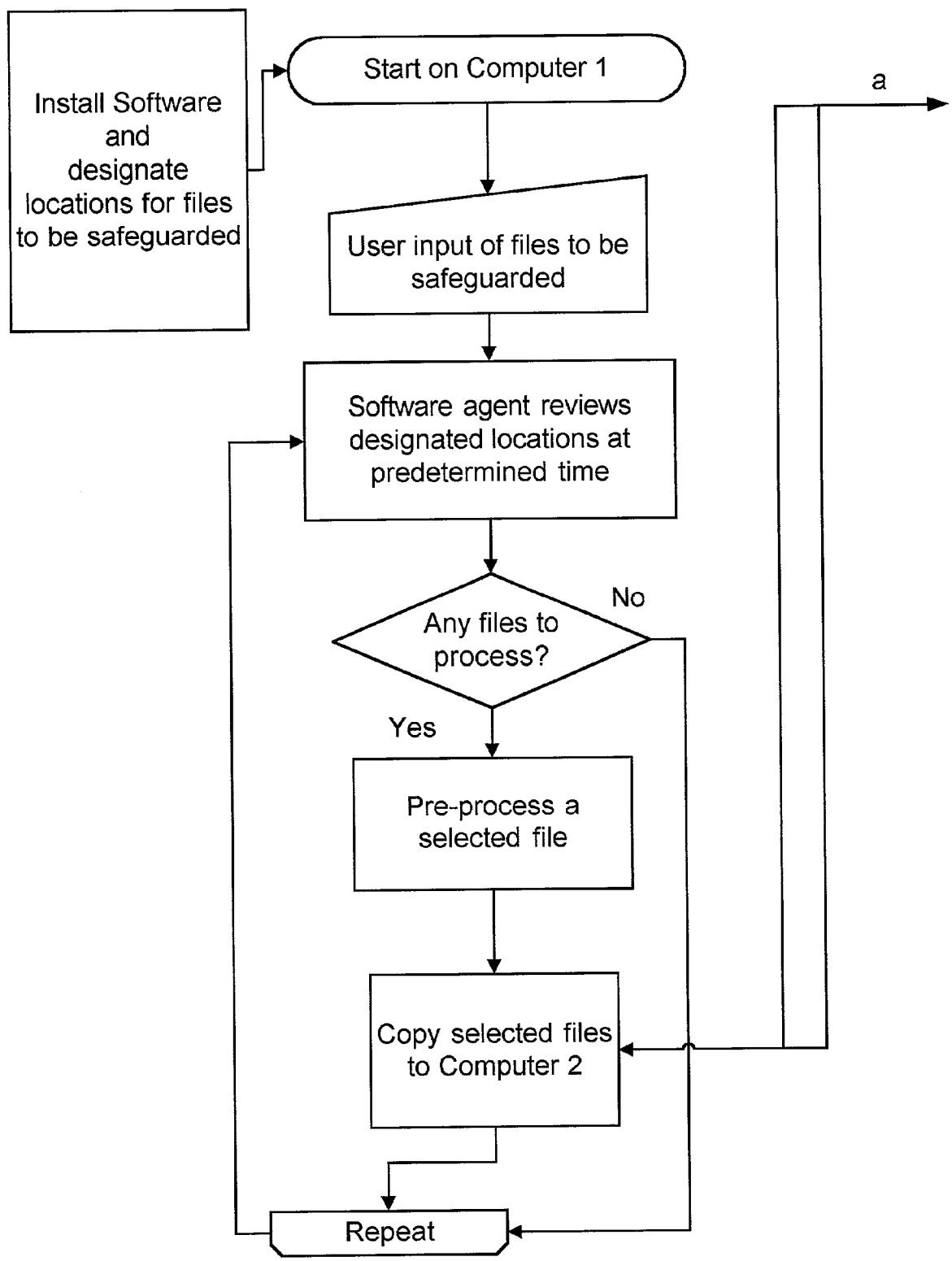
FIG. 2 is a flow chart showing the processing on a first computer for an embodiment of the present invention wherein files on a first computer are transferred to a second computer where they are encrypted, then stored on a third computer.
Figure 3:
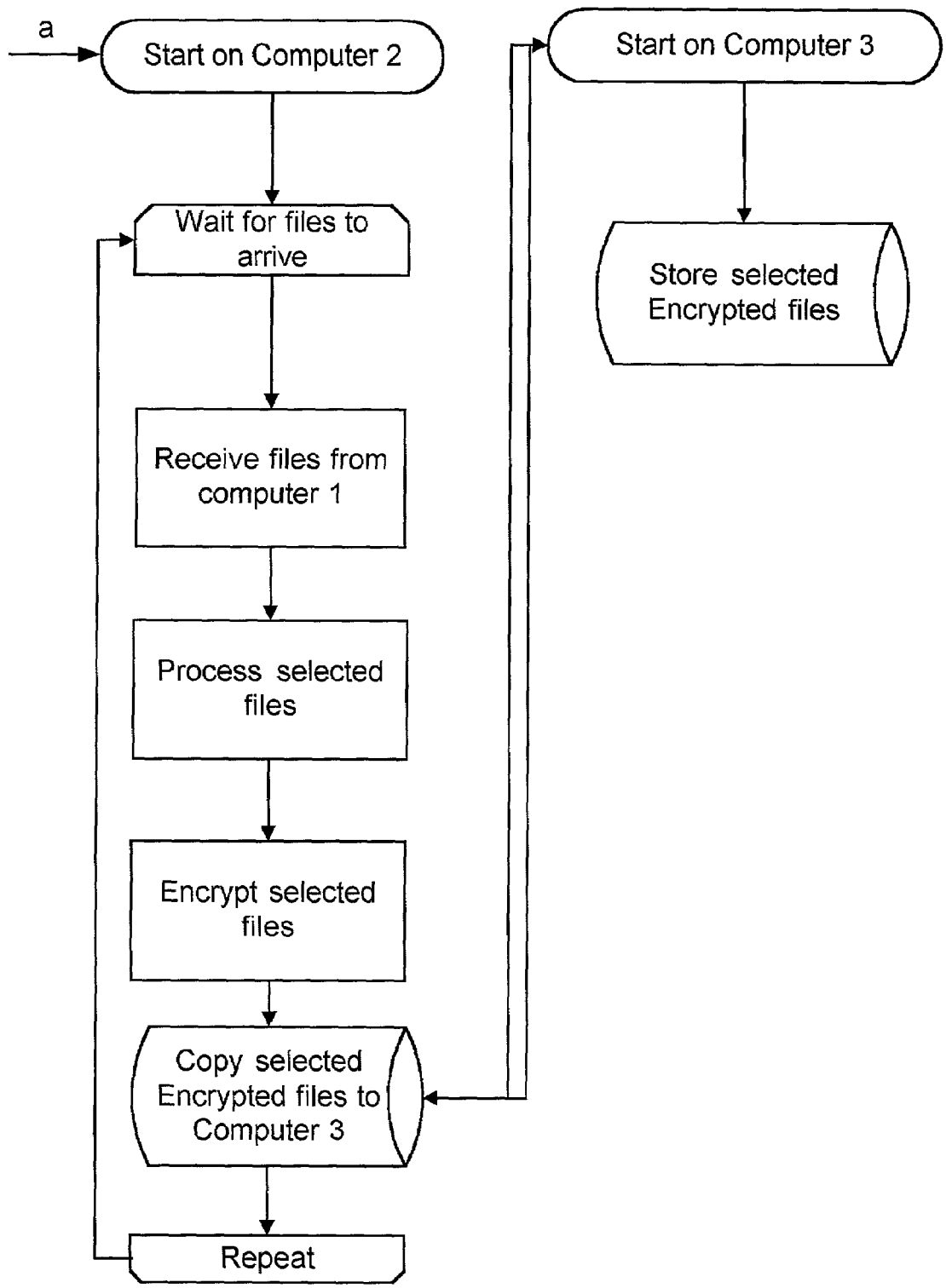
FIG. 3 is a flow chart showing the processing on a second and third computer for an embodiment of the present invention wherein files on a first computer are transferred to a second computer where they are encrypted, then stored on a third computer.
Figure 4:
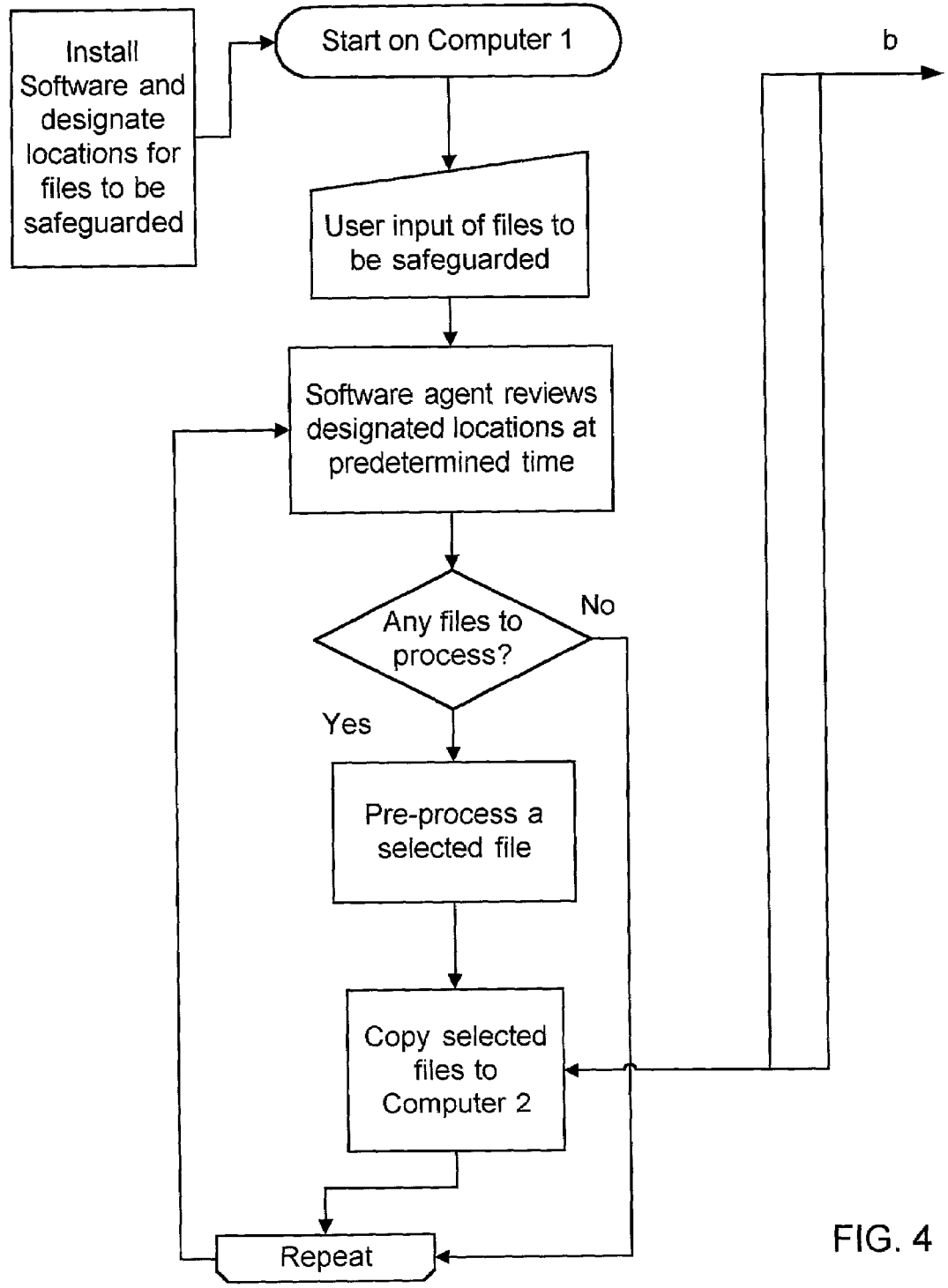
FIG. 4 is a flow chart showing the processing on a first computer for an embodiment of the present invention wherein files on a first computer are transferred and stored on a second computer and the files are deleted from the first computer.
Figure 5:
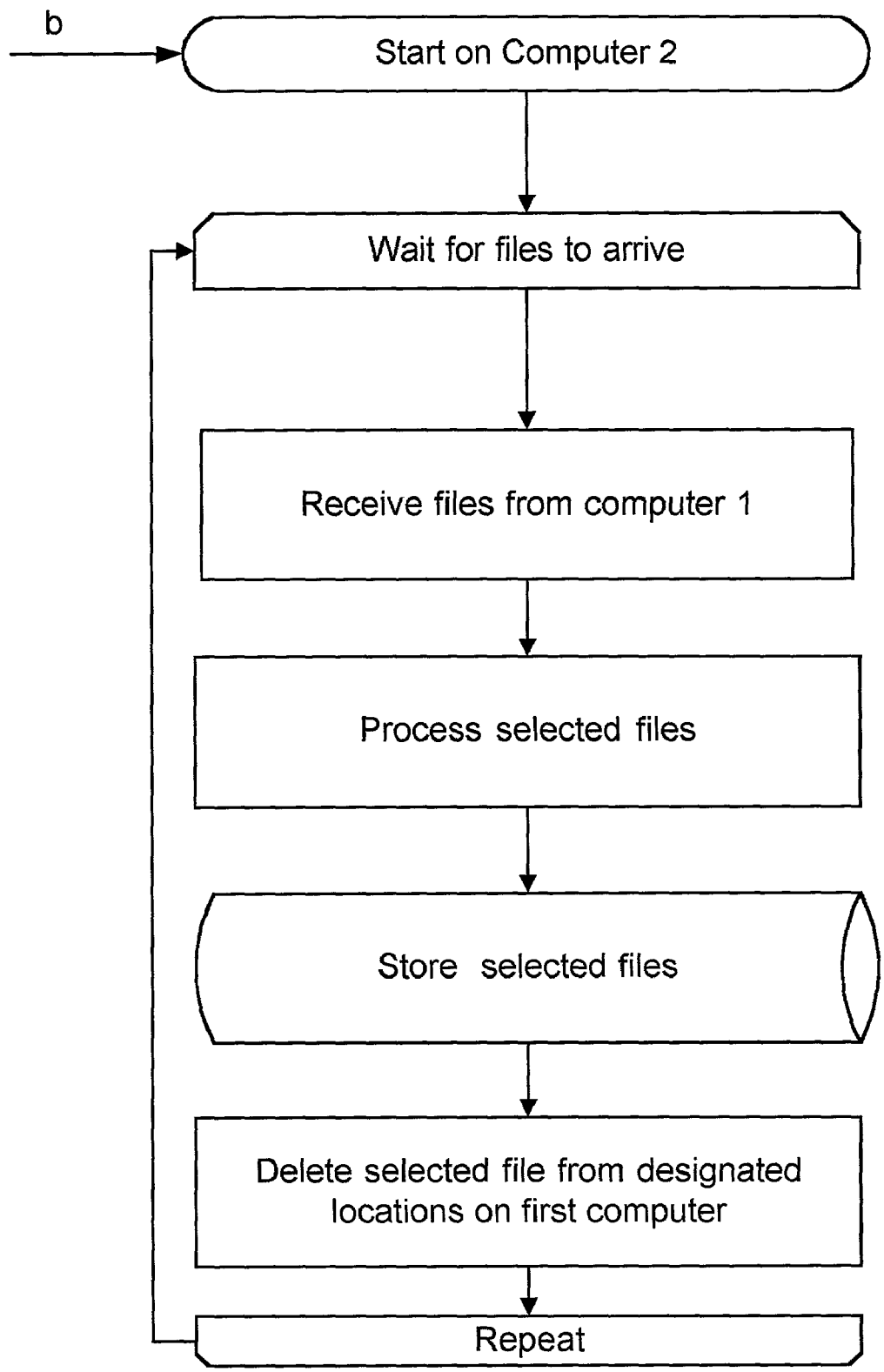
FIG. 5 is a flow chart showing the processing on a second computer for an embodiment of the present invention wherein files on a first computer are transferred and stored on a second computer and the files are deleted from the first computer.

In the following detailed description of the preferred embodiment of the invention, the following definitions apply:

Document

A document is a collection of information electronically stored as a single unit of ordered bytes on a computer system, often referred to as a computer file. Documents commonly contain information used by computer programs such as Microsoft Word, Excel, or PowerPoint, but may contain any arbitrary information. Documents usually have a name, often referred to as their filename. A software system or computer program may subdivide a document so that it contains other documents (such as a ZIP archive).

Document Fingerprint

A document fingerprint is a very large integer number calculated by applying a mathematical formula or algorithm to all of the bytes, in order, that make up a document. The value that results from this calculation is unique to a particular document (in that it is mathematically extraordinarily unlikely that two different documents would ever produce the same value). There are at least two common, accepted methods of fingerprinting documents: the Message Digest 5 algorithm (MD5) and the Secure Hash Algorithm 1 (SHA1).

A notable aspect of a document fingerprint is that it is not reversible; the document used to create it cannot be recreated or reverse-engineered from the fingerprint. An algorithm may repeatedly use a document or its identical copy to generate the same fingerprint, but an algorithm cannot use a fingerprint to generate the original document.

Publication

A publication is a collection of one or more documents that a computer program has assembled and processed into a predictable format. A publication often contains additional information about and renderings of the original documents. Note that, by definition, a publication is a document.

Unique Identifier

A unique identifier is a single, short, alphanumeric sequence that a system uses to select a specific document within a defined context. A particular software system may determine and assign a unique identifier within a particular context, making that unique identifier usable within that context. Alternatively, a software system may utilize an existing identifier that it determines is unique within an appropriate and possibly synchronous context.

An example of a unique identifier within a context is an automobile license plate number within a state. An example of assigning a simple unique identifier is taking a ticket with a number on it at a local delicatessen counter. (This latter example assumes that the tickets continuously provide incrementing numbers.)

Certification

Certification is the process of creating proof that a particular document or publication existed on a particular date and has not changed since. One of the aspects of certifying a document involves calculating the document fingerprint.

Safeguarding

Safeguarding is the process applied to documents or publications that combines the three elements of obtaining certification, assuring centralized accessibility, and providing secure third party storage (backup).

Internet Transmission

An Internet Transmission is a method of transferring documents or other information from one computer system to another computer system using the Internet or another TCP/IP network. The system accomplishes such a transmission using a standard method, such as file transfer protocol (ftp), hypertext transfer protocol (http), or via one or more e-mails (smtp). The system may utilize a secure transmission method (such as sftp, https, or S/MIME) depending on the chosen protocol. Any time the system uses an Internet Transmission to send information from a client to a server computer, information is included that securely authenticates the identity of the client (such as the client's name and a password).

Software Agent

A Software Agent is a computer program or set of computer programs that perform an unattended, automated process on a computer system either continuously, at scheduled intervals, or when triggered by some event. Examples of Software Agents, sometimes called system services, include automatic antivirus definition updaters, automatic disk defragmenters, and e-mail checker programs.

Publishing System

A Publishing System is a computer program or set of computer programs that takes one or more documents and processes them to create a publication. In the context of this document, a Publishing System may also perform a number of other tasks, such as offering access to publications, handling Internet Transmissions, and obtaining or creating document certification.

Unique Fingerprint Set

A Unique Fingerprint Set is a collection of document fingerprints and possibly other information related to a single publication or document that has a unique identifier. A Unique Fingerprint Set comprises the unique identifier and the fingerprint of the publication or document to which it refers.

If the set refers to a publication, it may also include:

The fingerprints of other renderings of the publication (such as a fingerprint of an encrypted version of the publication);

Fingerprints of documents held within the publication; and

Other information, such as the names of the documents held within the publication, dates, times, or other properties related to the publication.

If the set refers to a general document, it may also include:

The fingerprints of other renderings of the document (such as a fingerprint of an encrypted version of the document);

Other information associated with the document, such as creation or modification times, other document associations, or other properties related to the document.

Service Provider

A service provider is an entity such as a company that offers services to clients using the invention.

Invention Goals and Problems Solved

The present invention comprises two primary configurations, although other configurations are possible. The two primary configurations are Document Safeguarding, which incorporates all three concepts (certification, accessibility, and backup), and Document Certification (with Optional Archive), which is a subset.

Document Safeguarding

Innovation Rights Application

The Document Safeguarding for Innovation Rights Application enables clients to use internal documents to prove such things as the date of conception, invention, and first use of a technology while simultaneously providing a central location to search and access such documents, and optionally providing a complete third party backup of such documents.

The invention guarantees the availability and authenticity of documents when they are required for use later, such as during negotiations or at trial. The invention provides proof regarding such records as:

Invention disclosures, product development records, project presentation materials, business plans, marketing reports, and all other documents related to innovation, R&D, engineering, production, and legal review, and other documents to prove first to conceive, reduce to practice, and use/implement innovation (relevant to patent rights and defense against patent rights of others); and Other issues related to business relationships, such as prior development for conflicts over non-disclosure or confidential disclosure agreements.

Use of the product can demonstrate a road map of the development of technologies, processes, or products including dates and progress after initial conception of an idea.

Business Records Application

The Document Safeguarding for Business Records Application similarly enables clients to use internal documents as proof during formal or informal proceedings/negotiations including documents such as:

Patient billing and medical records, including film-less radiology images;

Compliance information, such as Medicare and/or Medicaid records, OSHA records, and any other records needed to demonstrate compliance with rules, processes, or regulations;

Insurance claims, including activity logs or claims diaries; and

Any other electronic records.

Use of the software helps clients convert from paper to paperless systems with confidence that the integrity of digital records will not become a costly issue.

Optionally, a service provider can provide encrypted archival backup services of client's documents. Using this service, the provider stores an encrypted copy of documents on the client's behalf. The client may later retrieve these encrypted copies, decrypt them using their keys, and recreate an identical copy of the original documents. This provides an excellent third-party safety mechanism to protect critical client information.

Document Certification (with Optional Archive)

The Document Certification configuration is a modularized component of Document Safeguarding. This configuration provides clients with the "Certification" feature of Document Safeguarding, without the "Accessibility" and "Backup" features. It therefore enables clients to obtain third-party authentication of internal documents that may be required for proof during litigation or other proceedings. The invention provides authentication of content, date, and origination for all documents.

Use of the invention can provide certification services whenever documents are migrated from one storage system to another, restored from an archival storage system, or otherwise when certification of document content relative to a particular date is required.

As in the case of Document Safeguarding, a service provider can optionally provide encrypted archival backup services of clients' documents. Using this option, at the same time the system certifies documents it stores an encrypted copy on the service provider's computers. A client may later retrieve this copy and decrypt it, thus recreating an identical copy of the original and providing a third-party protection mechanism.

The Document Certification configuration assumes that other existing facilities provide such things as accessibility/indexing and, if the Optional Archive option is not selected, robust long-term storage.

Product Facilities, Processes, and Methods

There are a number of possible methods of invention implementation depending on the desires and goals of the client. Each method addresses the invention's goals while balancing ease of use, implementation/maintenance complexities, and confidentiality requirements.

Document Safeguarding

A service provider can provide Document Safeguarding using two methods, the selection of which depends on the needs of the client. Both methods provide for the invention's three goals: document certification, document accessibility, and off site document backup.

The Shared Facilities Method

The shared facilities method allows the client to search, preview, and download their documents (contained in publications) via the secure service provider website. Using this method, access to documents is limited to the client (and selected service provider systems personnel covered by agreements). The computer industry sometimes refers to the shared facilities method as the Application Service Provider (ASP) model. In this case, the service provider is the ASP.

The Private Facilities Method

The private facilities method allows the client to search, preview, and download their publications by accessing an intranet-based system. In addition, the service provider provides regularly scheduled third-party certification of documents. Using this method, access to documents is limited to the client. A full copy of encrypted documents may be stored at the service provider facility for archival reasons, legally admissible backup, and/or safekeeping.

Safeguarding Methodology

Both methods require a facility to collect documents that the system will safeguard. To accomplish document collection, a service provider's Software Agent runs on one or more the client's computers. The agent locates documents needing processing and sends them to the service provider's Publishing System, wherever it may be housed.

When using shared facilities, documents are processed, stored, indexed, and retrieved using the service provider's Publishing System software running on the service provider's computers.

When using private facilities, a local computer system runs the service provider's Publishing System software. This computer system provides processing, access, and certain storage facilities. For document certification and offsite backup, the service provider's computers (also running the service provider's Publishing System software) provide certain processing and storage as well.

Implementation involves the following steps:

1. Users or computer programs that generate documents needing the service provider's protections save them at a common location on the client's network. Facilities such as a network share or Microsoft Exchange Server, or equivalent, could serve as the common location. This location can be the primary storage location of the documents or a copy of the documents.
2. At a regularly scheduled interval (probably once or twice each day), the service provider Software Agent scans the designated common location(s) and arranges for transmission of documents to the service provider's Publishing System. The agent, depending on client-selected parameters, can perform a variety of tasks.
  a. The agent can determine document selection and groupings based on documents' names, locations, dates, or other criteria. Most commonly, the agent selects new or modified documents. The agent may apply sophisticated criteria, perhaps using information stored at a predictable location inside certain types of documents or by referencing some additional database containing information about documents. If the agent groups documents, the service provider's Publication System will later process the group into a single publication.
  b. If the client chooses to place identical copies of the documents into the common area rather than store the original documents in the common area, the agent can remove the copies after processing them.
  c. The agent can compress or divide the document into parts if the transmission method has single unit size restrictions (such as a maximum e-mail size). This can be accomplished using standard compression programs, such as gzip, and standard document dividers, such as split.
  d. The agent may collect or calculate additional information regarding the selected documents for use by the service provider's Publishing System. For example, the agent calculates document fingerprints. The agent arranges for transmission of this additional information as well.
3. The service provider's Software Agent sends the selected documents and other information to the computer system running the service provider's Publishing System. In the shared facilities model, the agent utilizes an Internet Transmission to the service provider's computers. In the private facilities model, the agent utilizes an Internet Transmission or some other locally appropriate network protocol (including using such technologies as NFS, CIFS, NetBEUI, NetBIOS, TCP/IP, or IPSEC).
4. The service provider's Publication Systems creates publications by processing each group of one or more documents. (If the agent divided or compressed a document earlier, the system restores it by recombining and/or uncompressing its components appropriately.) The system places the publications in the client's private storage area on the service provider's computers. For each group, the system creates and stores the publications by performing such tasks as:
  a. Calculating document fingerprints;
  b. Guaranteeing that documents survived transmission without modification by comparing the fingerprints it calculates to the ones provided by the agent;
  c. Scanning documents for malware (computer viruses);
  d. Optionally rendering eligible, selected documents to Portable Document Format (PDF);
  e. Extracting and storing searchable text from eligible documents;
  f. Optionally creating HTML and thumbnail views of eligible documents;
  g. Generating additional documents containing supporting information, including creating documents containing any created views or extracted information;
  h. Assigning a unique publication number;
  i. Packaging the original and selected resulting documents together into a single new document (the new publication) using an archive format (such as PKZIP); and
  j. Calculating and recording a Unique Fingerprint Set for the new publication, which includes the unique publication number, the fingerprint of the new publication, the fingerprints of one or more of the documents in the publication, and any additional information desired.

The details of this processing are disclosed in commonly owned U.S. patent application No. 09/625,185, which is incorporated herein by reference.
5. A unique publication number is a set of alphabetic characters (such as "IPCOM") followed by a large zero-filled decimal integer (commonly nine digits, such as "000000001"). Each instance of the service provider's Publishing System has at least one different set of leading alphabetic characters; the instance running on the service provider's computers uses "IPCOM." To determine the unique integer portion, the system assigns one greater than the last unique integer that it previously assigned. If the system has never assigned a unique integer, a fixed starting value is used (usually "1"). Combining the leading alphabetic characters and the zero-filled decimal integer results in a unique publication number (such as "IPCOM000000001").

No two instances of the service provider's Publishing System should share common leading alphabetic characters. Within the realm of all of the service provider's Publishing Systems, unique publication numbers must be distinct from one another. If a particular system runs out of numbers (i.e., if using nine digits, more than 999,999,999 publications are created), the leading alphabetic characters may be changed on that system.
6. In the private facilities model, the service provider's Publishing System is operating on a local computer system. Each time the local system completes a publication, certain information is queued for transmission to the service provider's computers.
  a. Optionally, the system creates an encrypted version of the publication (using an encryption key available only to the client) and then places this encrypted version in the queue.
  b. The system may calculate and add the fingerprint of the encrypted version of the publication to the publication's Unique Fingerprint Set.
  c. The system places each publication's Unique Fingerprint Set into the queue.
  d. The system may place other information in the queue as necessary. For example, the system may place certain validation information in the queue.
  The system sends this queued information to the service provider's computers using an Internet Transmission. It may choose to send this information synchronously when local publishing completes or on a scheduled basis. If it sends the information on a scheduled basis, the system may choose to aggregate the information together into a single document.
7. In the private facilities model, the decision of what is stored long-term on the local computer system depends on the desired features and selected options.
  a. At a minimum, the local system maintains a publication index and the extracted searchable text for each publication to provide searching capabilities.
  b. If the local system sends encrypted publications to the service provider, it may remove the locally stored, unencrypted copy to conserve resources. If the local system does not send copies to the service provider, it must maintain a copy in local storage. The publications can be stored in an offline or other type of third-party permanent backup system if desired (although this may hinder quick access). If the client chooses not to send a copy of the publications to the service provider, it is imperative that the client implements other reliable backup methodologies for these publications.

c. If the local system removes the local publications, it automatically defers this action until the service provider's system validates the reception of the matching encrypted publications. This is accomplished using a process such as the following:

i. After the local system queues an encrypted publication for transmission to the service provider's computers (which was done in an earlier step), it adds the publication's unique identifier to a list. It may also add some additional associated information to the list, such as the date and time the encrypted publication was queued.

ii. On a predetermined schedule, the service provider Software Agent examines this list to see if the local copy of a particular unique publication is eligible for removal. The agent may choose to defer such action until some time has elapsed since the encrypted publication was queued.

iii. To determine if the service provider computers have received and properly stored the encrypted publication, the agent queries the service provider computers using an Internet Transmission. The query provides the unique publication identifier in question; the service provider computers respond appropriately using a return Internet Transmission.

iv. If the service provider computers indicate that they have properly stored and received the encrypted publication, the agent removes both the local publication and the publication's unique identifier (and associated additional information) from the list. Otherwise, the agent takes no action.

The data is stored in optical storage devices such as a compact disk read only memory (CD ROM), magnetic media such as floppy disks, hard drives, or magnetic tapes, or any other apparatus known in the art for long term storage of data.

In addition, when the client wishes to retrieve a publication, they receive the encrypted publication from the remote service provider computer and will need to decrypt it before use. Depending on the desired level of security enforcement, the service provider software may optionally provide automatic decryption.

i. If the client configures the system to remove local publications and then requests a particular publication for retrieval that the system has removed, the system uses an Internet Transmission to obtain the encrypted version of the publication from the service provider's computers. The transmission provides the unique publication identifier to retrieve; the service provider's computers respond with an Internet Transmission containing the requested encrypted publication.

ii. If the system employs an encryption methodology where the client chooses to allow the appropriate local computer systems to have access to the keys and software necessary to decrypt the publication, the system will utilize these facilities to decrypt the publication automatically. Otherwise, the system provides the encrypted version of the publication.

d. The local system may also either maintain or suppress locally stored thumbnails and display text depending on desired resource allocation and publication preview features.

8. In both the shared and private facilities model, when the service provider Publishing System completes a publication, the publication is certified. Document Certification utilizes the Unique Fingerprint Set created during the publication process. The section titled "Certification Methodology" details the certification process (found below).

Accessibility Methodology

The service provider's Publishing System provides the ability to search, preview, and retrieve documents that it publishes using one or more techniques such as structured database queries, full text indexing, or other indexing methods.

1. During the initial document publication process, the service provider's Publishing System, "extracts and stores searchable text from eligible documents." A document is eligible if the system has incorporated a method of opening the document and isolating any textual portion.

a. The system may use Microsoft's Word program to open document that Word is capable of opening and then use a Word facility (such as "Save As Text") to store just the textual portion of the document.

b. The system may use a facility such as Iceni's Argus program to open documents containing PDF (portable document format) data. Argus is a program specifically designed to extract textual information from PDF documents.

c. The system may use other facilities for other formats of documents as is necessary.

This process may be extended to isolate and extract other portions of documents, such as images.

2. The information made available for indexing includes any portion of the publication for which an indexing methodology exists. Examples include:

a. Whatever textual information the system extracted from the published documents;

b. Any additional information provided when the system created the publication, including such information as filenames, titles, abstracts, copyrights, countries or languages associated with the publication, people or entities associated with the publication, references to additional information, or any other such bibliographic, unstructured, or structured information as appropriate;

c. Machine translations from any information's current language to one or more alternate languages; and d. Any additional information created or associated by the system such as the unique identifier, fingerprints, or the date and time of publication.

3. The facilities that provide access to publications in the service provider Publication System include the abilities to restrict access to publications selectively based on permissions, control lists, or other approaches.

a. When a user accesses the search and retrieval portion of the system, they must first identify themselves using an authentication scheme, such as a username/password, a smartcard, a biometric identification, other method, or combination of methods.

b. When the system creates publications, it associates initial access permissions with them. If appropriate, the system may alter such access permissions at any time. These permissions grant or deny publication access to a user based on a variety of possible criteria, including being a specific user, being a member of a one or more groups of users, meeting certain conditions (such as a publication containing some specific item of information), or other determining factors.

c. If during the search and/or retrieval process, the system determines that a user does not have permission to access a publication, the system disallows or suppresses displays regarding the publication or retrieval of the publication. The system may therefore, based on evaluating a user and a publication, present results as if denied publications do not exist even if they are stored and indexed.

d. Implementation of the processes that control access, display, or retrieval of publications may implement permissions or control lists at any number of places, such as in the indexing, display, and/or retrieval methods.

4. To search for publications using the service provider's Publication System, a user accesses a web-based facility. After properly identifying themselves, they navigate to one of the pages that allow searching of one or more of the indices.

a. A user enters a query into a form presented on the selected web page. The form may provide for a variety of search options, including presenting a form-structured query, a syntax-based free-format query, or a combination of both. The form allows for entry of whatever information or fragment of information is necessary for a user to specify the search criteria. The system searches particular indices based on the form, and these indices define the nature of the search criteria information. The form and entry methods accommodate the search criteria information appropriately.

b. The system may present selections that allow for "pre-defined" queries, allowing a user to apply commonly used search criteria immediately without entry of additional information. An example of such a query is a selection that produces a "most recently published" list.

c. When a user is finished formulated a query using a selected web page, they submit the page. The system responds by processing the query appropriately and gathering the matching publications together in a list. The length of the list may be limited to some maximum count. The system presents the list using one or more web pages. The system briefly summarizes each publication by presenting selected information about the publication, including possibly information that is stored within the publication. (For example, for each publication found, the system may display the publication's unique identifier, title, and publication date.)

The system makes arrangements so that a user may take one or more actions regarding a publication, such as previewing or bookmarking it, by selecting links from the list.

5. A user may preview a publication so that they may select it for further action, such as retrieval, bookmarking, removal, or another operation. The preview web page may offer a variety of views and information regarding the publication.

a. The system may present "bibliographic" information regarding the publication, including such things as the title, language, publication date, abstract, and size. If any of this information is in a language other than a preferred language, the system may present a machine translation of the information to the preferred language.

b. The system may present one or more "thumbnail images" of each page of the publication if it is possible to create such renderings of the publication's documents. A thumbnail image is a reduction of a normally sized image for purposes of displaying overall content without specific details.

c. The system may present the extracted textual content of the publication's documents as well as possibly translated versions of such text.

d. The system may present any other renderings or information associated with the publication.

Any of these views and information may or may not be present in a particular publication's preview based on its availability to the system or appropriateness to the documents in the publication.

6. When a user selects a publication for retrieval, the system performs an appropriate transfer of the publication. The transfer of the publication may take place using an Internet Transfer or some other locally appropriate network protocol. Depending on the system's configuration, the document may require decryption following the transfer.

The system may provide an additional facility that allows for the packaging of multiple publications together so the system may transfer them as a single document.

Document Certification (with Optional Archive)

The Document Certification method provides definitive third party proof that no person or system has altered a particular document since a particular date. Using this method alone is applicable where a client does not desire full Document Safeguarding; Document Certification is the final step to Document Safeguarding.

The Optional Archive method provides the ability for clients to store an encrypted version of their documents on the service provider's computers. This optional facility is useful for clients who wish to know that a secure, third-party copy of their information remains available.

When using Document Certification, the system neither centrally indexes documents nor makes documents searchable. If the Optional Archive is not included, the service provider does not maintain a copy of any documents on the service provider's offsite computer systems. These methods are appropriate to applications that seek to certify documents where existing systems already perform these important tasks:

Collect documents in a central location,
Catalog and index the documents, and
Provide local backup of documents.

Using these methods, access to documents is restricted to and by the client. If the service provider receives copies of documents, its access is restricted to authorized users and its use is restricted to holders of the decryption keys. The service provider solely receives unique identifiers (often filenames), fingerprints of the documents, and optionally encrypted versions of the documents.

The service provider provides a Software Agent that calculates and collects document identifiers and fingerprints on the client's computer(s). The agent may optionally create encrypted versions of documents. Identifiers, fingerprints, and optional encrypted versions are then stored, indexed, and retrieved using the service provider's offsite computers.

1. Computer programs that generate documents needing protection store or make duplicates of them (possibly temporarily) at predictable location(s) on the client's network.

2. At a regularly scheduled interval, the service provider Software Agent scans the location(s) and creates Unique Fingerprint Sets for (and optionally encrypted versions of) the documents it finds.

a. To create a Unique Fingerprint Set, the system must first determine a unique document identifier.

i. The unique document identifier must not embody any proprietary information, as the service provider will later publicly disclose it.
ii. Normally, the criteria for creating a unique document identifier are readily determined based on the client's environment. (For example, the combined pathname and filename of the document may be unique.) If this is the case, the agent uses such criteria to create the identifier.
iii. If necessary, the agent will generate a unique document identifier. The agent accomplishes this by keeping a map of the information that it knows about the document (such as its filename, location, or other determinable properties) and associating it with a number. The agent assigns the number incrementally starting at a configured point as it encounters documents. This unique document identifier map is a critical item of information that requires robust storage.
b. The agent calculates the document fingerprint and may collect additional information that it associates with the document. This may be information like document size, document type, or any other properties associated with or discernable from or about the document.
c. Optionally, the agent creates an encrypted version of the document (using an encryption key available only to the client). The agent then calculates the fingerprint of the encrypted version.
d. The agent assembles this information (the identifier, the fingerprint(s), and any additional information) to create the Unique Fingerprint Set.
3. The agent arranges to send the Unique Fingerprint Set along with the optional encrypted version of the document to the service provider computers using an Internet Transmission. It is possible for the agent to collect sets and encrypted versions more often than it performs transmissions. Regardless of how many sets it collects, the agent may send the service provider a single, aggregated document containing one or more sets. This document may also contain additional information such as the client's name.
4. If the agent sends encrypted versions of documents, the service provider computers store this version in a location where it is accessible appropriately to authorized users. The client may reference and retrieve encrypted versions from the service provider offsite computers using the documents' unique identifiers. The service provider computers store this version in optical storage devices such as a compact disk read only memory (CD ROM), magnetic media such as floppy disks, hard drives, or magnetic tapes, or any other apparatus known in the art for long term storage of data.

Certification Methodology

The service provider computers perform certification of publications either on demand or at chosen intervals. Both Document Certification and Document Safeguarding utilize this process.

1. The service provider certifies publications and documents by placing Unique Fingerprint Sets into the public domain with a legally defensible date and time. The service provider places information into the public domain using the service provider Prior Art disclosure. Disclosures used for certification are always available for free downloading.
2. The service provider first obtains the Unique Fingerprint Sets.
    a. When a client uses Document Safeguarding under the shared facilities method, the service provider computers perform the publishing and generate the Unique Fingerprint Sets when they publish the client's documents.
    b. When a client uses Document Safeguarding under the private facilities method, the service provider's Publishing System on the local computer generates the Unique Fingerprint Sets. The local publishing system transmits these sets to the service provider as described earlier.
    c. When a client uses Document Certification, the service provider receives a document containing one or more Unique Fingerprint Sets as described earlier.
3. When the service provider is certifying one or more publications or documents, the system may create a disclosure containing one or more Unique Fingerprint Sets and any additional relevant information, such as the clients' names. The service provider may choose to aggregate many Unique Fingerprint Sets or documents containing Unique Fingerprints Sets into a single disclosure.
4. The service provider publishes the disclosure to its Prior Art database. This prior art publication contains the clients' names, associated Unique Fingerprint Sets, and other information as required by the service provider or the clients.
5. If it is necessary to certify a single publication, the service provider may separately provide a digital notarization instead of or concurrent with publishing the service provider Prior Art disclosure.

Once the service provider completes publishing the disclosure, it becomes available for public search and retrieval. The disclosure may then be located using the unique identifiers, document fingerprints, or any of the additionally included publication or document properties.

Authenticating Certified Documents

To authenticate a document as being identical to a certified document, a user or automated program follows these steps:

The unique identifier of the certified document is obtained;
The fingerprint of the document in question is calculated;
The unique identifier and/or the newly calculated fingerprint is searched for in the service provider's Prior Art database; and
If the database returns one or more matching disclosures, a disclosure's contents can confirm a match.

If the process finds more than one disclosure, the client or agent may have chosen to certify the document multiple times. The oldest matching disclosure describes the earliest date of certification.

The date of a matching disclosure is indisputable and therefore confirms that the document in question is identical to the certified document and that the document existed on or before that date.

An example of where the Document Certification method is particularly appropriate is in addition to an archival backup system that already collects documents in a central location before committing them to permanent storage. Such a backup system often allows for avoiding the generation of unique document identifiers and thereby enables a simple implementation.

Completion of Safeguarding

Once the Document Safeguarding process is complete, publications become available for secure search and retrieval by authorized client employees or agents. In the shared model, users access the service provider computers to locate and obtain publications; in the private model, users access local computers to locate and obtain publications. The safeguarded documents are protected and available in the future for any reason, including:

Use for proof at trial or other legal negotiation (via certification),

As a group- or enterprise-wide searchable document library (via accessibility), or Corporate off site document storage (via backup).

Thus it is seen that the objects of the invention are efficiently obtained, although changes and modifications to the invention should be readily apparent to those having ordinary skill in the art, and these modifications are intended to be within the spirit and scope of the invention as claimed.

What is claimed is:

1. A computer implemented method for safeguarding files, comprising the steps of:
   designating in a first computer a location for storage of files to be safeguarded;
   selecting certain of said files to be safeguarded from said location based upon predetermined selection criteria;
   preprocessing said selected files to be safeguarded, where said preprocessing includes the step of calculating a first fingerprint for each of said selected files to be safeguarded;
   copying said selected preprocessed files to be safeguarded;
   processing said selected files to be safeguarded on said second computer, where said processing includes the step of calculating a second fingerprint for each of said selected files to be safeguarded to obtain certification; and,
   storing said processed files in a third party restricted access database to provide centralized accessibility.

2. The computer implemented method for safeguarding files recited in claim 1 wherein said processing is further comprised of comparing said second file fingerprint to said first file fingerprint.

3. The computer implemented method of claim 1 wherein said processing comprises scanning said selected files to be safeguarded for malware.

4. The computer implemented method of claim 1 wherein said processing comprises rendering eligible, selected files to Portable Document Format (pdf).

5. The computer implemented method of claim 1 wherein said processing comprises extracting and storing searchable text from said selected files.

6. The computer implemented method of claim 5 wherein said selected files are PowerPoint presentation software files.

7. The computer implemented method of claim 6 wherein said extracting and storing searchable text from said PowerPoint presentation software files comprises reading said software files, interpreting content of said file based on a known format of PowerPoint presentation software files, and storing said content interpreted as searchable text.

8. The computer implemented method of claim 1 wherein said processing comprises creating HTML views of said selected files to be safeguarded.

9. The computer implemented method of claim 1 wherein said processing comprises creating thumbnail views of said selected files to be safeguarded.

10. The computer implemented method of claim 1 wherein said processing comprises assigning a unique publication number to each of said selected files to be safeguarded.

11. The computer implemented method of claim 1 wherein said processing comprises calculating and collecting a unique fingerprint set for said selected files to be safeguarded.

12. The computer implemented method of claim 1 wherein said processing comprises digitally notarizing said selected files to be safeguarded.

13. The computer implemented method of claim 1 wherein said first computer and said second computer are located at different sites.

14. The computer implemented method of claim 1 further comprising enabling a search of said restricted access database via the World Wide Web.

15. The computer implemented method of claim 1 wherein said selecting of said files to be safeguarded at said designated location occurs periodically.

16. The computer implemented method of claim 1 wherein said storage of said selected files in a restricted access database occurs on a third computer.

17. The method of claim 1 wherein said processing of said selected files on said second computer comprises encrypting said selected files to be safeguarded.

18. A computer implemented method for safeguarding files, comprising the steps of:
   designating on a first computer a location for storage of files to be safeguarded;
   selecting certain of said files to be safeguarded from said location based upon predetermined selection criteria;
   preprocessing said selected files to be safeguarded, where said preprocessing comprises the step of calculating a first fingerprint for each of said selected files to be safeguarded;
   copying said selected files to be safeguarded to a second computer;
   deleting said selected files from said location;
   processing said selected files to be safeguarded on said second computer, where said processing comprises the step of calculating a second fingerprint for each of said selected files to be safeguarded to obtain certification; and,
   storing said processed files in a third party restricted access database to provide centralized accessibility.

19. The computer implemented method for safeguarding files recited in claim 18 further comprising the step of preprocessing said selected files to be safeguarded after said files to be safeguarded have been selected.

20. The computer implemented method for safeguarding files recited in claim 18 wherein said deleting said selected files from said first computer is done after said selected files to be safeguarded have been stored in said restricted access database.

21. The computer implemented method for safeguarding files recited in claim 18 wherein said predetermined selection criteria comprises files to be safeguarded that have different file names than files previously stored in said restricted access database.

22. The computer implemented method for safeguarding files recited in claim 18 wherein said predetermined selection criteria comprises files to be safeguarded that have different dates of creation than files previously stored in restricted access database.

23. The computer implemented method for safeguarding files recited in claim 18 wherein said predetermined selection criteria comprises files to be safeguarded that have different checksums than files previously stored in said restricted access database.

24. The computer implemented method for safeguarding files recited in claim 18 wherein said predetermined selection criteria comprises files to be safeguarded that have different fingerprints than files previously stored in said restricted access database.

25. The computer implemented method for safeguarding files recited in claim 18 wherein said copying said selected files to be safeguarded to a second computer comprises transmitting said files to be safeguarded from said first computer to said second computer over a network.

26. The computer implemented method for safeguarding files recited in claim 25 wherein said network is a global computer information network.

27. The computer implemented method for safeguarding files recited in claim 26 wherein said global computer information network is the Internet.

28. The computer implemented method for safeguarding files recited in claim 18 wherein copying said selected files is accomplished with a protocol selected from the group consisting of ftp, sftp, http, https, smtp, and S/MIME.

29. The computer implemented method for safeguarding files recited in claim 18 wherein said step of calculating a first fingerprint for each of said selected files to be safeguarded occurs at said second computer.

30. The computer implemented method for safeguarding files recited in claim 18 wherein said processing is further comprised of comparing said second file fingerprint to said first file fingerprint.

31. The computer implemented method of claim 18 wherein said processing comprises scanning said selected files to be safeguarded for malware.

32. The computer implemented method of claim 18 wherein said processing comprises rendering eligible, selected files to Portable Document Format (pdf).

33. The computer implemented method of claim 18 wherein said processing comprises extracting and storing searchable text from said selected files.

34. The computer implemented method of claim 33 wherein said selected files are PowerPoint presentation software files.

35. The computer implemented method of claim 34 wherein said extracting and storing searchable text from said PowerPoint presentation software files comprises reading said software files, interpreting content of said file based on a known format of PowerPoint presentation software files, and storing said content interpreted as searchable text.

36. The computer implemented method of claim 18 wherein said processing comprises creating HTML views of said selected files to be safeguarded.

37. The computer implemented method of claim 18 wherein said processing comprises creating thumbnail views of said selected files to be safeguarded.

38. The computer implemented method of claim 18 wherein said processing comprises assigning a unique publication number to each of said selected files to be safeguarded.

39. The computer implemented method of claim 18 wherein said processing comprises calculating and collecting a unique fingerprint set for said selected files to be safeguarded.

40. The computer implemented method of claim 18 wherein said processing comprises digitally notarizing said selected files to be safeguarded.

41. The computer implemented method of claim 18 wherein said first computer and said second computer are located at different sites.

42. The computer implemented method of claim 18 further comprising enabling a search of said restricted access database via a computer network.

43. The computer implemented method of claim 42 wherein said computer network is a global information computer network.

44. The computer implemented method of claim 42 wherein said computer network is the Internet.

45. The computer implemented method of claim 18 wherein said selecting of said files to be safeguarded at said designated location occurs periodically.

46. The computer implemented method of claim 18 wherein said storage of said selected files in a restricted access database occurs on a third computer.

47. The method of claim 46 wherein said processing of said selected files on said second computer comprises encrypting said selected files to be safeguarded.

48. The computer implemented method for safeguarding files recited in claim 1 wherein calculating a first fingerprint for each of said selected files to be safeguarded further comprises calculating said first fingerprint in said first computer.

49. The computer implemented method for safeguarding files recited in claim 1 wherein said predetermined selection criteria comprises files to be safeguarded that have different file names than files previously stored in said restricted access database.

50. The computer implemented method for safeguarding files recited in claim 1 wherein said predetermined selection criteria comprises files to be safeguarded that have different dates of creation than files previously stored in said restricted access database.

51. The computer implemented method for safeguarding files recited in claim 1 wherein said predetermined selection criteria comprises files to be safeguarded that have different checksums than files previously stored in said restricted access database.

52. The computer implemented method for safeguarding files recited in claim 1 wherein said predetermined selection criteria comprises files to be safeguarded that have different fingerprints than files previously stored in said restricted access database.

53. The computer implemented method for safeguarding files recited in claim 1 wherein said copying said selected files to be safeguarded to a second computer comprises transmitting said files to be safeguarded from said first computer to said second computer over a network.

54. The computer implemented method for safeguarding files recited in claim 53 wherein said network is a global computer information network.

55. The computer implemented method for safeguarding files recited in claim 54 wherein said global computer information network is the Internet.

56. The computer implemented method for safeguarding files recited in claim 1 wherein copying said selected files is accomplished with a protocol selected from the group consisting of ftp, sftp, http, https, smtp, and S/MIME.

57. The computer implemented method for safeguarding files recited in claim 1 wherein said step of calculating a first fingerprint for each of said selected files to be safeguarded occurs at said second computer.

58. A computer-based apparatus for safeguarding files, comprising:
- means for designating in a first computer a location for storage of files to be safeguarded;
- means for selecting certain of said files to be safeguarded from said location based upon predetermined selection criteria;
- means for preprocessing said selected files to be safeguarded after said files to be safeguarded have been selected, where said preprocessing comprises the step of calculating a first fingerprint for each of said selected files to be safeguarded;
- means for copying said selected files to be safeguarded to a second computer;
- means for deleting said selected files from said location;
- means for processing said selected files to be safeguarded on said second computer, where said processing includes the step of calculating a second fingerprint for each of said selected files to be safeguarded to provide certification; and,
- means for storing said processed files in a third party restricted access database to provide centralized accessibility, where said means for designating, selecting, preprocessing, copying, deleting, processing, and storing are located in at least one specially programmed general purpose computer.

59. The apparatus for safeguarding files of claim 58 wherein said means for storing said selected files to be safeguarded in a restricted access database comprise a magnetic media storage device.

60. The apparatus for safeguarding files of claim 59 wherein said magnetic media storage device comprises a hard drive.

61. The apparatus for safeguarding Plies of claim 59 wherein said magnetic media storage device comprises a floppy drive.

62. The apparatus for safeguarding files of claim 59 wherein said magnetic media storage device comprises a magnetic tape drive.

63. The apparatus for safeguarding files of claim 58 wherein said means for storing said selected files to be safeguarded in a restricted access database comprise an optical media storage device.

64. The apparatus for safeguarding files of claim 63 wherein said optical media storage device comprises a compact disk read only memory (CD-ROM) drive.

65. A computer-based apparatus for safeguarding files, comprising:
- means for designating in a first computer a location for storage of files to be safeguarded;
- means for selecting certain of said files to be safeguarded from said location based upon predetermined selection criteria;
- means for preprocessing said selected files to be safeguarded, where said preprocessing includes calculating a first fingerprint for each of said selected files to be safeguarded;
- means for coping said selected preprocessed files to be safeguarded to a second computer;
- means for processing said selected files to be safeguarded on said second computer, where said processing includes the step of calculating a second fingerprint for each of said selected files to be safeguarded to obtain certification; and,
- means for storing said processed files in a third party restricted access database to provide centralized accessibility, where said means for designating, selecting, preprocessing, copying, processing, and storing are located in at least one specially programmed general purpose computer.

66. The apparatus for safeguarding files of claim 65 wherein said means for storing said selected files to be safeguarded in a restricted access database comprise a magnetic media storage device.

67. The apparatus for safeguarding files of claim 66 wherein said magnetic media storage device comprises a hard drive.

68. The apparatus for safeguarding files of claim 66 wherein said magnetic media storage device comprises a floppy drive.

69. The apparatus for safeguarding files of claim 66 wherein said magnetic media storage device comprises a magnetic tape drive.

70. The apparatus for safeguarding files of claim 65 wherein said means for storing said selected files to be safeguarded in a restricted access database comprise an optical media storage device.

71. The apparatus for safeguarding files of claim 70 wherein said optical media storage device comprises a compact disk read only memory (CD-ROM) drive.

* * * * *

UNITED STATES PATENT AND TRADEMARK OFFICE
CERTIFICATE OF CORRECTION

| | | |
|---|---|---|
| PATENT NO. | : 7,174,332 B2 | Page 1 of 1 |
| APPLICATION NO. | : 10/167187 | |
| DATED | : February 6, 2007 | |
| INVENTOR(S) | : Samuel C. Baxter and Thomas J. Colson | |

It is certified that error appears in the above-identified patent and that said Letters Patent is hereby corrected as shown below:

Col. 15, claim 1, should read as follows:

1. A computer implemented method for safeguarding files, comprising the steps of:
    designating in a first computer a location for storage of files to be safeguarded;
    selecting certain of said files to be safeguarded from said location based upon predetermined selection criteria;
    preprocessing said selected files to be safeguarded, where said preprocessing includes the step of calculating a first fingerprint for each of said selected files to be safeguarded;
    copying said selected preprocessed files to be safeguarded to a second computer;
    processing said selected files to be safeguarded on said second computer, where said processing includes the step of calculating a second fingerprint for each of said selected files to be safeguarded to obtain certification; and,
    storing said processed files in a third party restricted access database to provide centralized accessibility.

Signed and Sealed this

Seventeenth Day of April, 2007

JON W. DUDAS
*Director of the United States Patent and Trademark Office*